(12) United States Patent
Olderdissen et al.

(10) Patent No.: US 7,616,568 B2
(45) Date of Patent: Nov. 10, 2009

(54) GENERIC PACKET GENERATION

(75) Inventors: Jan Olderdissen, Newbury Park, CA (US); Marko Rauhamaa, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 416 days.

(21) Appl. No.: 11/557,059

(22) Filed: Nov. 6, 2006

(65) Prior Publication Data

US 2008/0107104 A1 May 8, 2008

(51) Int. Cl.
*H04L 12/26* (2006.01)
*H04L 12/56* (2006.01)
*G06F 15/173* (2006.01)

(52) U.S. Cl. .................... 370/231; 709/224; 709/238; 370/235; 370/389

(58) Field of Classification Search ............ 370/389, 370/392, 344, 241, 241.1, 244, 245, 247, 370/251, 248, 252, 253; 709/224
See application file for complete search history.

(56) References Cited

U.S. PATENT DOCUMENTS

| | | | |
|---|---|---|---|
| 5,343,463 A | 8/1994 | van Tetering | |
| 5,477,531 A * | 12/1995 | McKee et al. | 370/249 |
| 5,487,066 A * | 1/1996 | McNamara et al. | 370/436 |
| 5,517,504 A * | 5/1996 | Tran et al. | 370/347 |
| 5,530,701 A * | 6/1996 | Stillman et al. | 370/410 |
| 5,657,438 A | 8/1997 | Wygodny | |
| 5,671,351 A | 9/1997 | Wild | |
| 5,745,836 A * | 4/1998 | Williams | 725/125 |
| 5,787,147 A | 7/1998 | Gunderson | |
| 5,787,253 A | 7/1998 | McCreery | |
| 5,822,520 A * | 10/1998 | Parker | 709/230 |
| 5,956,674 A * | 9/1999 | Smyth et al. | 704/200.1 |
| 6,028,847 A | 2/2000 | Beanland | |
| 6,091,802 A | 7/2000 | Smith et al. | |
| 6,108,800 A | 8/2000 | Asawa | |
| 6,122,670 A | 9/2000 | Bennett | |
| 6,148,277 A | 11/2000 | Asava | |
| 6,172,989 B1 | 1/2001 | Yanagihara | |
| 6,233,256 B1 | 5/2001 | Dieterich | |
| 6,295,557 B1 | 9/2001 | Foss | |
| 6,345,302 B1 | 2/2002 | Bennett | |
| 6,360,332 B1 | 3/2002 | Weinberg | |
| 6,446,121 B1 | 9/2002 | Shah | |
| 6,477,483 B1 | 11/2002 | Scarlat | |
| 6,526,259 B1 | 2/2003 | Ho | |
| 6,601,020 B1 | 7/2003 | Myers | |

(Continued)

OTHER PUBLICATIONS

Zec, Marko and Mikuc, Miljenko, Real-Time IP Network Simulation at Gigabit Data RateJun. 2003, Proceedings of the 7th International Conference on Telecommunications (ConTEL).

*Primary Examiner*—Alpus H Hsu
*Assistant Examiner*—Jessica Clifton
(74) *Attorney, Agent, or Firm*—SoCal IP Law Group LLP; Steven C. Sereboff; John E. Gunther

(57) ABSTRACT

There are disclosed processes and systems relating to simulated real-time packet generation to test a communications network. A first packet stream is defined and transmitted. Each packet in the first packet stream is composed from a first background data field and one or more user defined fields that overlay the first background data field.

14 Claims, 11 Drawing Sheets

U.S. PATENT DOCUMENTS

| | | |
|---|---|---|
| 6,678,246 B1 | 1/2004 | Smyth |
| 6,789,100 B2 | 9/2004 | Nemirovsky |
| 6,845,352 B1 * | 1/2005 | Wang .......................... 703/24 |
| 6,889,385 B1 * | 5/2005 | Rakib et al. ................. 725/119 |
| 6,904,110 B2 * | 6/2005 | Trans et al. ................. 375/350 |
| 6,950,405 B2 | 9/2005 | Van Gerrevink |
| 7,342,897 B1 * | 3/2008 | Nader et al. ................. 370/255 |
| 2001/0007574 A1 * | 7/2001 | Liu et al. .................... 375/219 |
| 2001/0016867 A1 | 8/2001 | Hu |
| 2001/0030963 A1 * | 10/2001 | Yoshimura et al. ........... 370/393 |
| 2001/0032334 A1 * | 10/2001 | Dapper et al. ................ 725/105 |
| 2002/0016852 A1 * | 2/2002 | Nishihara .................... 709/236 |
| 2002/0037008 A1 | 3/2002 | Tagami |
| 2002/0056017 A1 * | 5/2002 | Morgan et al. ............... 710/264 |
| 2002/0061012 A1 * | 5/2002 | Thi et al. .................... 370/352 |
| 2002/0080781 A1 | 6/2002 | Gustavsson |
| 2002/0138226 A1 | 9/2002 | Doane |
| 2002/0177977 A1 | 11/2002 | Scarlat |
| 2003/0009544 A1 | 1/2003 | Wach |
| 2003/0231741 A1 | 12/2003 | Rancu |
| 2004/0010612 A1 | 1/2004 | Pandya |
| 2004/0030757 A1 | 2/2004 | Pandya |
| 2004/0224637 A1 * | 11/2004 | Silva et al. .................. 455/63.4 |
| 2005/0055586 A1 * | 3/2005 | Flen et al. .................... 713/300 |
| 2005/0157756 A1 * | 7/2005 | Ormond ...................... 370/474 |
| 2005/0186933 A1 * | 8/2005 | Trans .......................... 455/296 |
| 2005/0254456 A1 * | 11/2005 | Sakai et al. .................. 370/328 |
| 2006/0064520 A1 * | 3/2006 | Anand et al. ................... 710/52 |
| 2006/0064529 A1 * | 3/2006 | Anand et al. .................. 710/260 |
| 2006/0182096 A1 * | 8/2006 | Dispensa et al. ............. 370/352 |
| 2006/0285501 A1 * | 12/2006 | Damm ........................ 370/252 |
| 2007/0047443 A1 * | 3/2007 | Desai et al. .................. 370/235 |
| 2007/0076583 A1 * | 4/2007 | Hadad ......................... 370/203 |
| 2007/0092012 A1 * | 4/2007 | Wilhelmsson et al. ........ 375/260 |
| 2007/0100215 A1 * | 5/2007 | Powers et al. ................ 600/300 |
| 2007/0223388 A1 * | 9/2007 | Arad et al. ................... 370/252 |
| 2007/0265015 A1 * | 11/2007 | Lagerman ................. 455/452.1 |
| 2007/0270118 A1 * | 11/2007 | Subramanian et al. ... 455/343.2 |
| 2008/0013480 A1 * | 1/2008 | Kapoor et al. ............... 370/328 |
| 2008/0095106 A1 * | 4/2008 | Malladi et al. .............. 370/329 |

* cited by examiner

| User Defined Field | Parameters |
|---|---|
| Random | Start of UDF<br>Length of UDF<br>Seed number |
| Counter | Start of UDF<br>Length of UDF<br>Initial value<br>Increment |
| UDP Header Checksum | Start of UDF<br>Start of the IP header<br>Start of the UDP header<br>Length of the header plus data |
| IP Header Checksum | Start of UDF<br>Start of the IP header<br>Length of the IP header |
| Table | Start of the UDF<br>Length of the UDF<br>Location of first table entry<br>Number of table entries |

FIG. 5

GENERIC PACKET GENERATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optimized traffic generation for testing a communications network.

2. Description of the Related Art

In many types of communications networks, each message to be sent is divided into portions of fixed or variable length. These portions may be referred to as packets, frames, cells, datagrams, or data units, all of which are referred to herein as packets. Communications networks that transmit messages as packets are called packet switched networks.

Each packet contains a portion of the original message, commonly called the body of the packet. In addition, each packet contains identification and routing information, commonly called a packet header. The packets are then sent individually over the network through multiple switches or nodes and then reassembled at a final destination using the information contained in the packet headers, before being delivered to a target device or end user. At the receiving end, the reassembled message is passed to the end user in a format compatible with the user's equipment.

Most packet switched networks operate according to a set of established protocols, implemented in a collection of interfaced layers known as a protocol stack. These layers may be defined according to the Open Systems Interconnect (OSI) model, having seven layers (from top to bottom): application, presentation, session, transport, network, data-link and physical.

All but the physical layer of a protocol stack are typically software, though the network and data-link layer may be firmware and/or hardware. Each layer of the protocol stack typically exists to perform a specific function, such as addressing, routing, framing and physical transmission of packets. When a packet is to be transmitted over a network from a source system to a destination system, the packet will pass in a logically downward direction through layers of the protocol stack on the source system, and in a logically upward direction through corresponding layers of the protocol stack on the destination system. Each layer passes the packet to the adjacent layer, either up or down the protocol stack depending on whether the packet has been received or is being transmitted.

Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing.

A variety of standards are known for use in packet switched networks. One of the best known of these, the TCP/IP suite, is typically used to manage reliable transmission of packets throughout the Internet and other IP networks. The TCP/IP standard defines five layers: physical, link, network (IP), transport (TCP) and application. These layers correspond to layers 1, 2, 3, 4 and 7 of the OSI model respectively. Common practice, however, is to describe layers 1, 2, 3, and 4 as the TCP/IP stack, and to view the application layer as lying on top of the stack.

The transport layer of TCP/IP corresponds to layer 4 of the OSI model. The transport layer allows source and destination machines to carry on a reliable conversation with each other.

A second commonly-used transport layer protocol is the UDP (User Datagram Protocol). Unlike TCP, UDP provides no error recovery or reliability mechanisms. Because of this simplicity, UDP packets have shorter headers than TCP packets, and thus consume fewer system resources. Among other applications, UDP may be used to transmit real-time audio or video content.

The IP layer in TCP/IP or UDP/IP corresponds to the network layer of the OSI model. The IP layer provides addressing information to facilitate independent routing of packets within or between networks.

The link layer under TCP/IP or UDP/IP corresponds to the data-link layer of the OSI model. The link layer includes network interface card drivers to connect the machine to the physical network, such as an Ethernet network.

An important application-layer protocol is Real-Time Transport Protocol (RTP) which may be used to deliver data with real-time characteristics. A typical application of RTP is to deliver audio or video content to one or more recipients participating in an interactive session. RTP is normally used with UDP, but may also be used with TCP or other transport-layer protocol. RTP packets do not contain any provisions for error recovery, but do contain both a sequence number and a timestamp. RTP packets are transmitted in sequence, and the embedded information may be used on reception to reconstruct the proper sequence.

RTP is commonly used in conjunction with the RTP Control Protocol (RTCP) which sends and receives periodic control packets interleaved with RTP packets. The function of RTCP is essentially to keep track of the participants in the interactive session.

In general, the machines that implement the RTP/UDP/IP protocol stack are computers. Each of these computers includes one or more processors, memories, and input/output ports, and is managed by an operating system.

The computer memory may include a user space and a kernel space. The kernel space is an area of memory which is strictly reserved for running the kernel, device drivers and any kernel extensions. The UDP/IP protocol stack typically resides in kernel space, and the RTP and RTCP protocols typically reside in user space. Though some portions of the kernel space may be swapped (paged) out to the disk, some portions are typically never swappable. The user space is a memory area used by all applications and this memory can typically be swapped out at any time depending upon the current system requirements. The user space and the kernel space are distinct. An application program usually cannot access the kernel space directly. Application programs may, however, use the kernel to access system resources and hardware through system calls, and are therefore thought of as running above, or on top of, the kernel.

Typically, when an incoming packet enters a computer or other hardware device running a protocol stack, the destination of the packet may be some specific code within the kernel, or it may be an application program. In any event, the packet will typically be processed by multiple layers of the protocol stack and finally arrive at its destination. Similarly, an outgoing packet will typically be processed by multiple layers of the protocol stack before being transmitted onto the network.

When data (e.g., a byte stream) passes between the application layer and the UDP/IP protocol stack's transport layer, the data moves between user space and kernel space. Since user space and kernel space are separate areas of memory, however, the process of moving data includes copying the data to the destination area. This may also include deleting the original, either right away or in a housekeeping operation. Thus, in practice, once an outgoing payload has been processed by the application program in user space, it is copied to kernel space to be processed by the protocol stack. Similarly, once an incoming packet reaches the top of the UDP/IP protocol stack, its payload is copied to user space to be processed by the application.

DESCRIPTION OF THE DRAWINGS

FIG. 5 is a table of example user defined fields.

DETAILED DESCRIPTION

Throughout this description, the embodiments and examples shown should be considered as exemplars, rather than limitations on the apparatus and methods of the present invention.

Description of Systems

Figure 1:
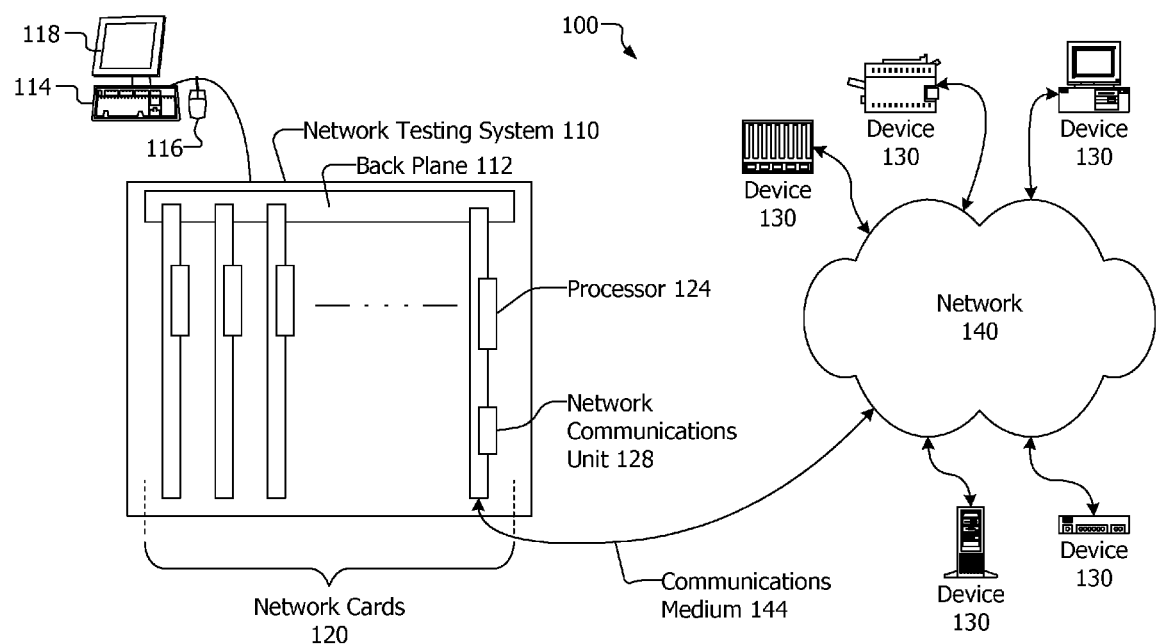
FIG. 1 is a diagram of an network testing environment.

FIG. 1 shows a block diagram of an environment 100 for testing a network. The environment includes network testing system 110 coupled via a network card 120 to a network 140 over a communications medium 144. The network testing system 110 may include or be one or more of a performance analyzer, a conformance validation system, a network analyzer, a data unit blaster, a network management system, a combination of these, and/or others. The network testing system 110 may be used to evaluate and/or measure characteristics and performance of a communication line or system, including the throughput of network traffic, the number of dropped data units, jitter, and many others. The network testing system 110 may be used to evaluate the performance of servers, networking devices such as, for example, routers, gateways, load balancers, and others, as well as network application programs and other software.

The network testing system 110 may be in the form of a chassis or card rack, as shown in FIG. 1, or may be an integrated unit. Alternatively, the network testing system 110 may comprise a number of separate units such as two or more chassis cooperating to provide network analysis, network conformance testing, and other tasks. The chassis of the network testing system 110 may include one or more network cards 120 and a backplane 112. The network cards 120 may be coupled with the backplane 112. One or more network cards 120 may be included in the network testing system 110. The network cards 120 may be permanently installed in the network testing system 110, may be removable, or may be a combination thereof.

The network testing system 110 and/or one or more of the network cards 120 may include an operating system such as, for example, versions of MS DOS, Microsoft Windows, Mac OS, Palm OS, Symbian OS, Unix or Linux.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fiber optic cable, and coaxial cable, and may be wireless.

The network testing system 110 and the network cards 120 may support one or more well known higher level communications standards or protocols including the Real-Time Transport Protocol (RTP) and the User Datagram Protocol (UDP); may support one or more well known lower level communications standards or protocols such as, for example, the 10 and/or 100 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®) and Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The backplane 112 may serve as a bus or communications medium for the network cards 120. The backplane 112 may also provide power to the network cards 120.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or the backplane 112.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, application programs running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including frames, cells, datagrams, data units, higher level logical groupings of data, or other units of information, all of which are referred to herein as packets. Those packets that are communicated over a network are referred to herein as network traffic. The network traffic may include packets that represent electronic mail messages, computer files, web pages, graphics, documents, audio and video files, streaming media such as music (audio) and video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The hardware and firmware components of the network testing system 110 may include various specialized units, circuits, software and interfaces for providing the functionality and features described herein. The hardware components of the network testing system 110 may include a processor including at least one hardware timer. Within this description, a hardware timer is any device or circuit, either within or connected to the processor, that can be set under software control to provide an interrupt to the processor after a desired time interval.

The functionality and features described herein may be embodied in whole or in part in software which operates on a computer and take the form of firmware, an application program, an applet (e.g., a Java applet), a browser plug-in, a COM object, a dynamic linked library (DLL), a script, one or more subroutines, a device driver, or an operating system component or service. The software may be stored, at least in part, on a computer readable storage medium. The hardware and software of the invention and its functions may be distributed.

Additional and fewer units, modules or other arrangement of software, hardware and data structures may be used to achieve the systems and devices described herein.

To communicate packets on the network 140, the network testing system 110 and other systems and devices may include a protocol stack. The network testing system 110 may have various types of applications programs, such as test applications. These test applications may reside in user space on the top of the protocol stack. Test applications have functions such as performance analysis, conformance validation, network analysis, and network management.

Figure 2:
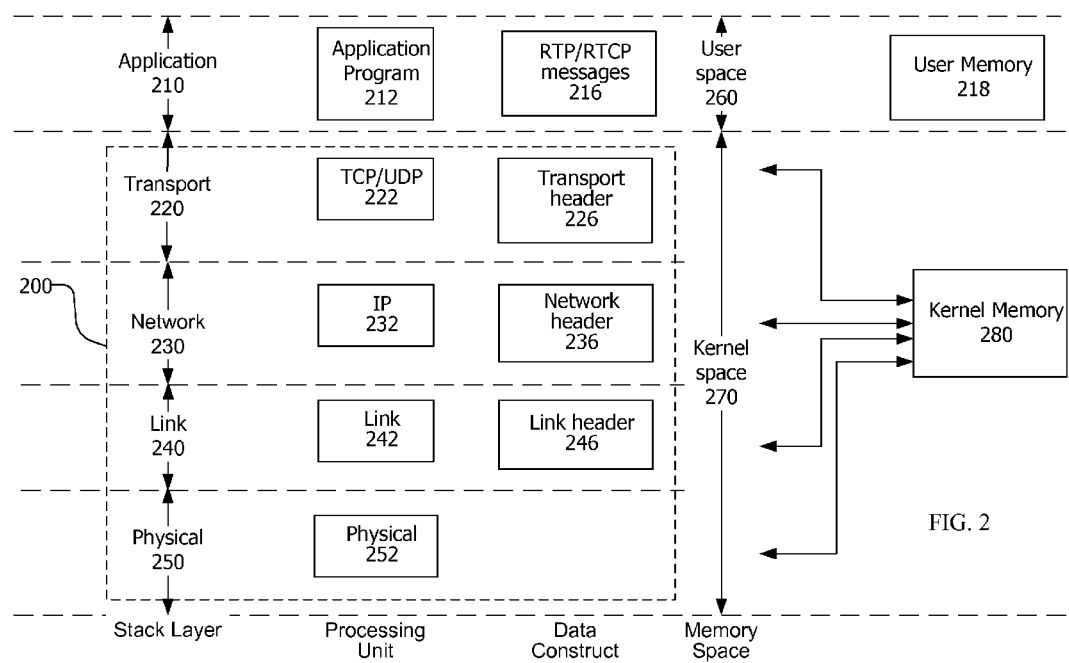
FIG. 2 is a diagram of a logical arrangement of a protocol stack in a communications apparatus.

Referring now to FIG. 2, there is shown a diagram of a logical arrangement in a communications apparatus defined by a user space 260 and a kernel space 270. The communications apparatus is logically divided into five layers 210, 220, 230, 240, 250, which in FIG. 2 are demarcated by dashed lines. The application layer 210 is in user space 260. The other layers 220, 230, 240, 250 are in kernel space 270.

Within kernel space 270 there is a kernel memory 280 and a conventional TCP/IP or UDP/IP protocol stack 200, comprising the transport layer 220, the network layer 230, the link layer 240, and the physical layer 250.

Within the application layer 210, there is an application program 212 and application data 216. The application program 212 may be a test manager, test executive, or other application.

The TCP/IP or UDP/IP protocol stack 200 has the four layers described above: transport 220, network 230, link 240, and physical 250. The TCP/IP or UDP/IP protocol stack 200 runs entirely in kernel space 270. For each layer 220, 230, 240, 250 of the TCP/IP or UDP/IP protocol stack 200 there may be a corresponding processing unit 222, 232, 242, 252, memory constructs and data constructs 226, 236, 246. The processing units may be implemented at least in part by software instructions executed by a common or separate processor. The software instructions may be stored on a computer readable storage medium.

Within the transport layer 220, there is a transport unit 222 and a transport header 226. The transport unit 222 forms transport headers for transmission and interprets received transport headers. In either the UDP or TCP transport layer protocols, the transport header may include a checksum.

Within the network layer 230, there is a network unit 232 and a network header 236. In a TCP/IP or UDP/IP protocol stack, the network protocol is IP. The network unit 232 forms network headers. In IP, the network header 236 also includes a checksum.

Within the link layer 240, there is a link unit 242, and a link header 246. The link layer may also include a transmit queue and a receive queue that are not shown in FIG. 2. The link unit 242 forms link headers for transmission and interprets received link headers. The link header may be an Ethernet MAC header, though other protocols may be used, such as ATM and Sonet.

The physical unit 252 frames and transmits packets, and receives and de-frames packets. The physical unit 252 may be or have hardware for assembling packets. The physical unit 252 may also include hardware for generating checksums as packets are transmitted.

Figure 3:
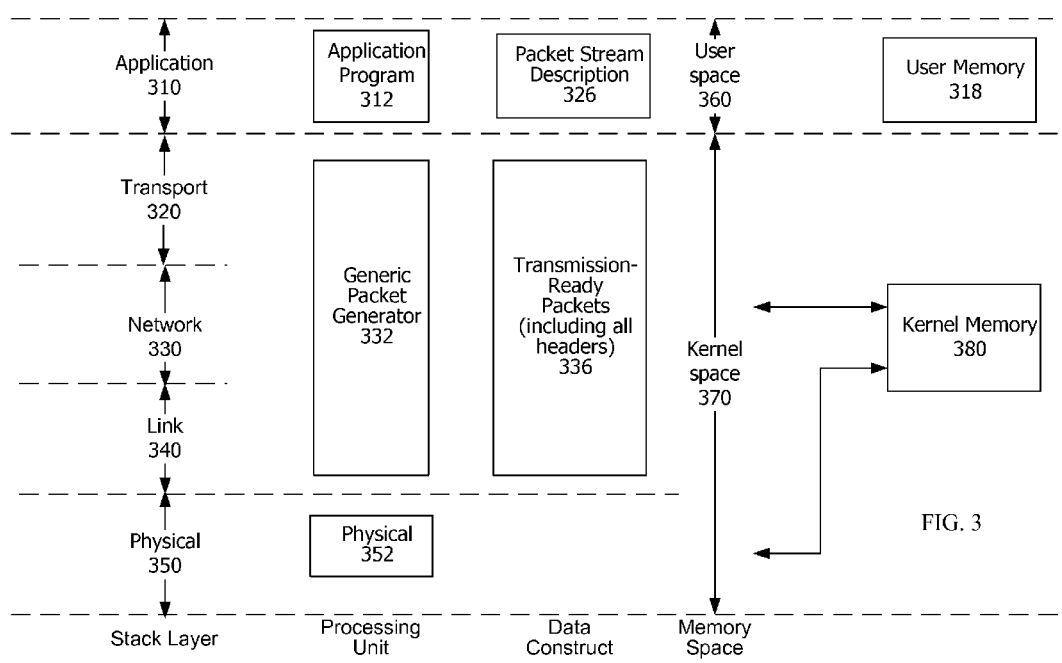
FIG. 3 is a diagram of a logical arrangement of a packet generator in a communications apparatus.

FIG. 3 shows a different logical arrangement in a communications apparatus adapted for transmission of synthetic real-time packet streams in a network testing apparatus. The logical arrangement of FIG. 3 may be divided into a user space 360 and a kernel space 370. An application program 312 may be operative in user space, and a generic packet generator 332 may be operative in kernel space. While the generic packet generator 332 may logically replace the transport, network, and link processing units of FIG. 2, the generic packet generator 332 may not have the functionality of the conventional UDP/IP stack.

The application program 312 may provide a packet stream description 326 to the generic packet generator 332. Within this document, a packet stream is defined as a plurality of packets to be transmitted to a specific recipient in sequence at a nearly constant packet frequency. The term packet frequency is defined as the rate at which the packets are transmitted. Packet frequency may be defined in terms of the number of packets transmitted per second, or any other convenient measure. The inverse of the packet frequency is the time interval between the start of transmission of successive packets in a packet stream. The packet frequency is very different from the bit rate at which the packets are transmitted over the network. For example, a packet stream for transmitting real-time audio information may only require a few hundred packets per second, but each packet may be transmitted at a 10 GHz bit rate.

Figure 4:
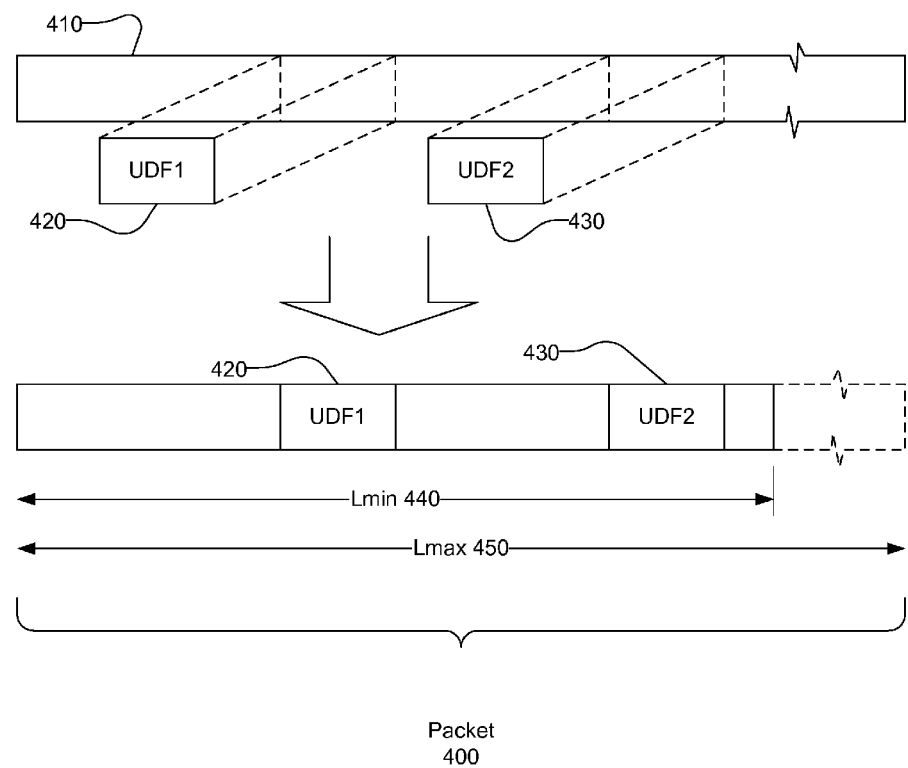
FIG. 4 is a diagram of the content of a generic packet.

The packet stream description 326 may be a data set that defines a packet stream. The packet stream description 326 may include the total number of packets in the stream, the packet frequency of the stream, and the form and content of the plurality of packets in the stream. Referring to FIG. 4, the form and content of the packets may be defined by a background data 410 and one or more user defined fields (UDFs) 420, 430. The background data may define the length of the packet and the content that is fixed or constant for all packets in the packet stream. The background data may be considered as a template for the packets in the packet stream.

The one or more UDFs 420, 430 may define data that changes in each successive packet. The UDFs 420, 430 may overlay and replace portions of the background data 410 to form the transmission-ready packet 400. The packet stream description 326 may include data defining each UDF. This data may include the type of the UDF, the start of the UDF (or some other data to define the position of the UDF within the packet), the length of the UDF, and one or more parameters that define how the UDF changes in each successive packet. The length of the UDF may be defined explicitly or may be intrinsic for the type of UDF. An example of a UDF is a counter field that has a defined initial value for the first packet in the packet stream, and then increments by a defined amount for each successive packet. An example of a UDF with an intrinsically defined length is an IP checksum field, which is always 16 bits. Other examples of UDFs are a random number field, a UDP checksum field, and a table look-up field that selects values from a table in sequence. FIG. 5 shows a table listing the parameters that may be included in a packet stream description 324 to define these example UDFs. Note that these five UDFs are useful examples but must not be considered as a complete list of possible UDFs. UDFs may be defined that are dependent on the value of other UDFs. Additional UDFs may be defined without limit as needed to satisfy a network testing requirement.

Referring again to FIG. 4, the packet stream description may include a minimum packet length (Lmin) 440, a maximum packet length (Lmax) 450, and a definition of a statistical distribution of packet lengths between Lmin and Lmax. The generic packet generator (332 in FIG. 3) may then determine a random length for each packet consistent with the packet stream description.

Referring now to FIG. 3, the generic packet generator 332 may receive the packet stream description 326 from the application program 312. The generic packet generator 332 may then compose or assemble packets in accordance with the packet stream description 326. The generic packet generator 332 may provide transmission ready packets 336 to the physical unit 352 for transmission over a network under test. The generic packet generator 332 may provide packets to the physical unit 352 at intervals defined by the packet frequency defined in the packet stream description 326. For each packet, the generic packet generator may compose the packet by calculating and filling one or more UDFs.

The generic packet generator 332 may not add any additional information to the packet beyond that contained in the packet stream description 326. Thus the packet stream description 326 may include, either in the background data or in UDFs, all of the fields required to transmit the packet over the network. Depending on the nature of the network and the tests being performed, these fields may include any of a MAC header, a LAN tag, a source address, a destination address, port numbers, flags, fillers, payload data, and any other data required to transmit the packet over the network using the protocols being simulated by the packet stream.

Description of Methods

Figure 6:
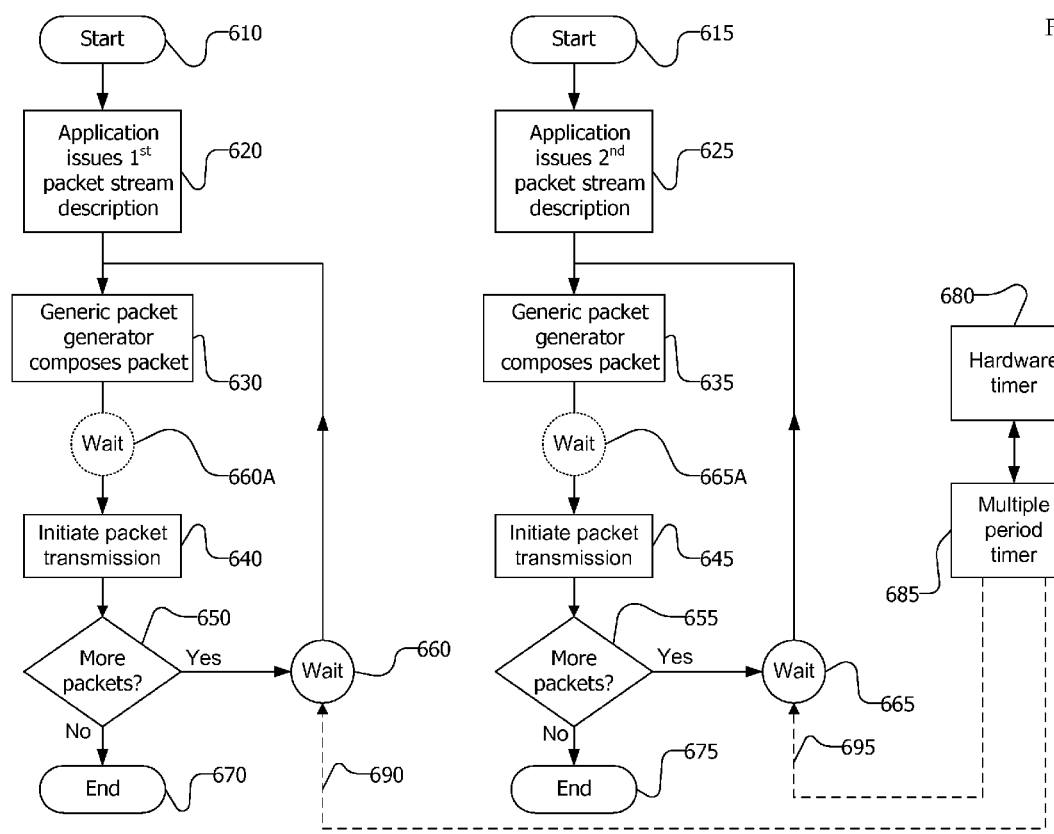
FIG. 6 is a flow chart of a process of operating a packet generator in a device to transmit data.

Referring now to FIG. 6 there is shown a simplified exemplary flow chart of a process of operating a generic packet generator to compose and transmit packets. Within this description, composing a packet means to define all of the data that comprises the packet in accordance with a packet stream description. Where required, composing the packet may also involve determining a random length for the packet. FIG. 6 is consistent with the network testing system of FIG. 1 and the logical arrangement of FIG. 3, but is compatible with others.

The flow chart of FIG. 6 illustrates the process for transmitting two packet streams concurrently under control of a single hardware timer 680. In this description, concurrently means within the same time period, and simultaneously means at the exact same time. It is possible for a network testing system to transmit many, possibly thousands, of packet streams concurrently, but it is not possible to transmit more than one packet simultaneously through a single physical device (for example, 352 in FIG. 3).

The process to transmit the first packet stream starts at 610 and concludes at 670. At 620, an application program operative in user space may issue a packet stream description for the first packet stream. At step 630, a generic packet generator operative in kernel space composes the first packet in the packet stream. Composing the first packet may include evaluating the value of one or more UDFs and overlaying the UDFs onto a background data as defined in the first packet stream description. Transmission of the first packet is initiated at 640. Initiating the packet transmission may involve transferring the packet to a hardware unit (such as 352 in FIG. 3) that will transmit the packet. The hardware unit may, in some cases, also compose part of the packet such as calculating checksums in accordance with the packet stream description. A decision is made at 650, and the process for transmitting the first packet stream ends at 670 if all packets have been transmitted, or waits at 660 if more packets need to be transmitted. While the process for transmitting the first packet stream waits at 660, other processes may continue within the same hardware/software environment.

Alternatively, the process may wait at 660A rather than 660. In this case, the generic packet generator would compose the next packet in the packet stream before entering the wait state.

The process for transmitting the first packet stream waits at 660 or 600A until a multiple period timer 685 indicates (implied by dashed line 690) that it is time to transmit the next packet in the first packet stream. The multiple period timer 685, which will be described in more detail in subsequent paragraphs, interacts with a hardware timer 680 to control the times at which packets are transmitted such that the first packet stream is transmitted at a first packet frequency defined in the first packet stream description.

The process steps 610, 620, 630, 640, 650, 660/660A, and 670 constitute a packet stream process that can be replicated to provide additional packet streams.

FIG. 6 illustrates a second packet stream process starting at 615 and ending at 675. The process for transmitting the second packet stream is essentially the same as that previously described for the first packet stream. After transmitting a packet, the process for the second packet stream waits at 665 or 665A until the multiple period timer 685 indicates (dashed line 695) that it is time to transmit the next packet in the second packet stream. The multiple period timer 685 controls the times at which packets are transmitted such that the second packet stream is transmitted at a second packet frequency defined in the second packet stream description. The first and second packet frequencies may not be equal. Alternatively, the first and second packet frequencies may be equal, with the transmission of the packets of the first and second packet streams offset in time.

A network testing system such as 110 in FIG. 1 may need to generate a large number, possibly thousands, of packet streams concurrently. The process shown in FIG. 6 can be extended to a large number of packet streams by replicating the packet stream process (steps 610, 620, 630, 640, 650, 660/660A, and 670) for each additional packet stream. A single multiple period timer 685 may control the transmission of a large number of packet stream processes.

Figure 7:
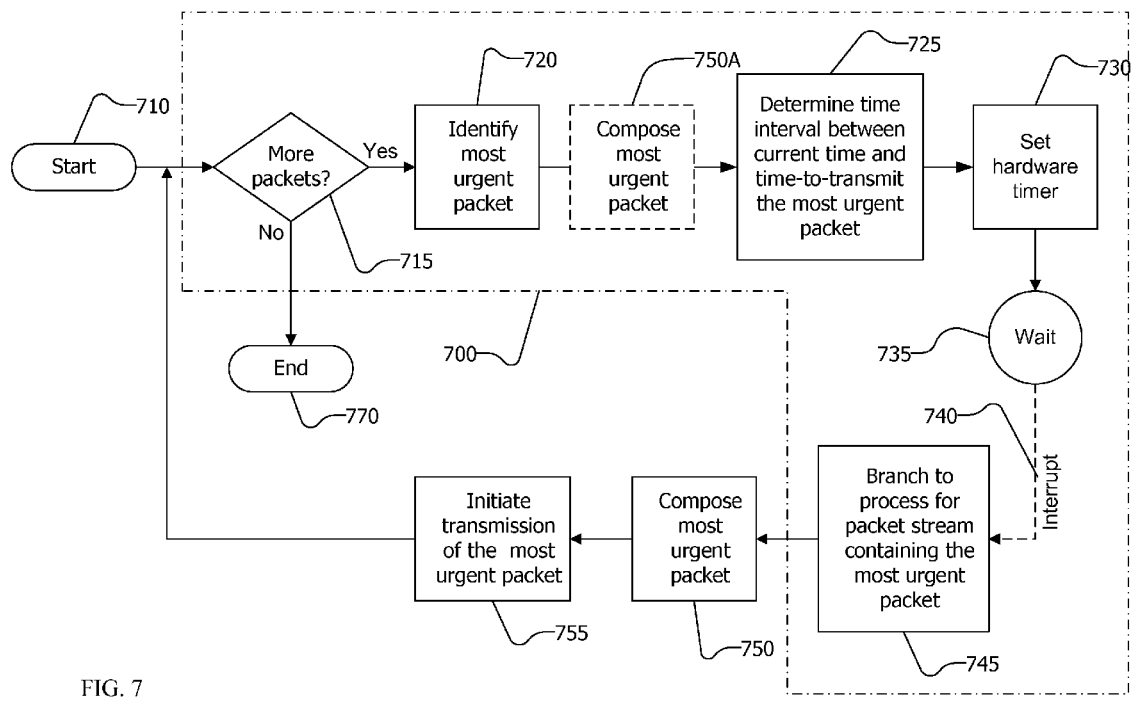
FIG. 7 is a flow chart of a process for a multiple period timer process.

Referring now to FIG. 7, the multiple period timer process is shown within the dashed line 700. The process begins at 710, which may occur when a first packet stream description is provided from the application program to the generic packet generator. A decision is made at 715, and the process may terminate at 770 if all packets have been transmitted for all packet streams. At 720, the process may identify what is termed the "most urgent packet", which is simply the single packet from all of the packet streams that must be transmitted next. In the event that more than one packet needs to be transmitted at the same or nearly the same instant, arbitration logic may be used to select the most urgent packet.

At 725, the time interval between the present time and the future time at which the most urgent packet needs to transmitted may be determined. This time interval may be measured in computer clock cycles or some other measure. At 730, the hardware timer may be set to provide an interrupt after a time period equal to the time interval determined at step 725. For example, a Power PC microprocessor has a single hardware timer commonly termed a decrementer. The decrementer can be set to a binary value under software control, and will then decrement, or count down by 1, each computer clock cycle. The decrementer issues an interrupt when the value has decremented to −1. Other computing devices may provide a similar hardware timer capability. Some computing devices may provide more than one hardware timer, but no practical computing device can provide enough hardware assets to use a different hardware timer for each of the packet streams in a networking testing apparatus.

After the hardware timer is set at 730, the multiple period timer process may wait at 735 until an interrupt is received from the hardware timer. Other processes may be ongoing in the same hardware/software environment while the multiple period timer process waits. When the interrupt from the hardware timer is received (dashed line 740), the multiple period timer process may branch at 745 to the packet stream process containing the most urgent packet. The most urgent packet is composed at 750 and transmission is initiated at 755. Steps 750 and 755 are portions of the packet stream process previously described in the discussion of FIG. 6. The multiple period timer process then returns to the start and repeats continuously until all of the packets in all of the packet streams have been transmitted.

Alternatively, the most urgent packet can be composed at 750A, before the process 700 sets the hardware timer and waits at 735.

One portion of the multiple timer process 700 that may be computationally time consuming is identifying the most urgent packet 720. Thus some technique may be needed to organize the packet streams such that the most urgent packet can be easily and efficiently identified.

Since each packet stream may be simulating some form of real traffic according to a standard protocol, the number of unique packet frequencies may be much less than the total number of packet streams. Thus the packet streams may be sorted into frequency groups, with each group containing packet streams that share a common packet frequency and a common period between packets within a packet stream (equal to the inverse of the packet frequency). Within each frequency group, the transmission of the member packet streams will occur sequentially in time within this period. Moreover the order of the sequential transmission will be consistent for each cycle of the packet frequency, assuming no packet streams are added to or dropped from the frequency group.

Figure 8:
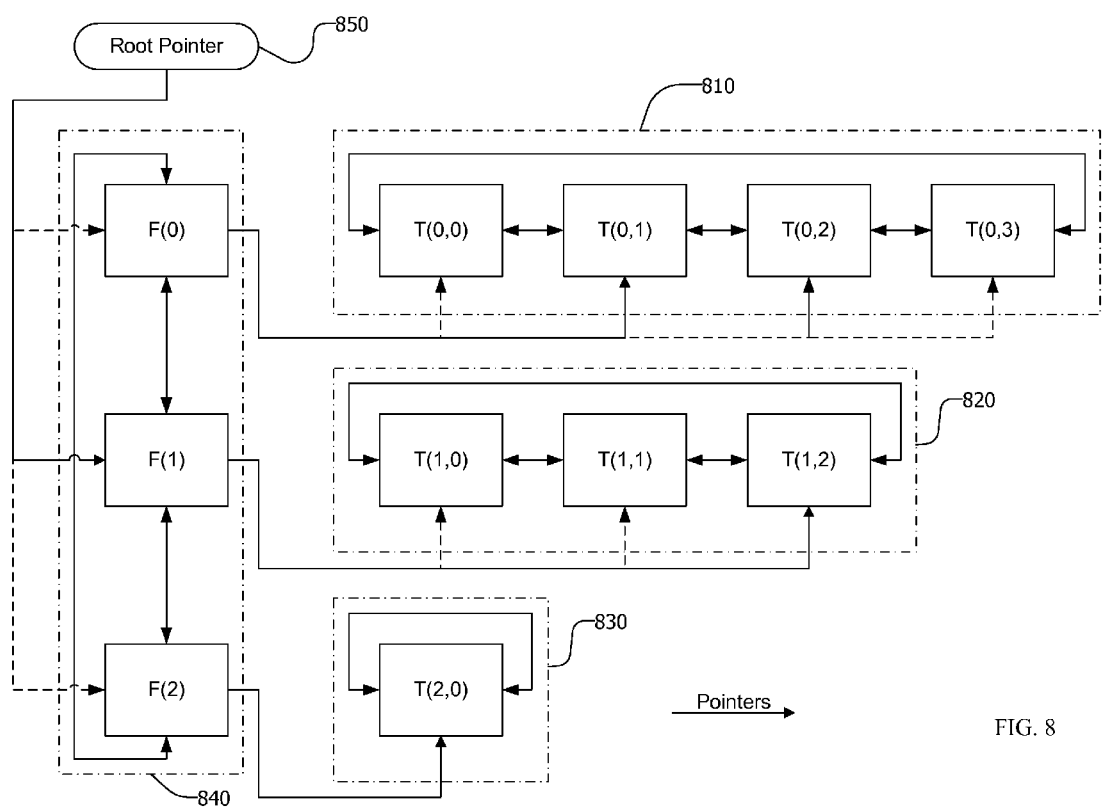
FIG. 8 is a block diagram of data structures in a multiple period timer.

FIG. 8 illustrates the use of software data structures to organize the packet streams. FIG. 8 shows eight timer data structures, each of which may be associated with a packet stream. Each of the timer data structures is represented by a rectangle containing an identification in the form T(a,b), where a is the number of the frequency group, and b is the sequence within the frequency group. The eight timer data structures in FIG. 8 are sorted into three frequency groups 810, 820, and 830. Frequency group 810 contains four timer data structures T(0,0), T(0,1), T(0,2), and T(0,3). Frequency group 820 contains three timer data structures T(1,0), T(1,1), and T(1,2), and frequency group 830 contains a single timer data structure T(2,0). Note that FIG. 8 is presented as an example only, and a realistic network testing situation may require dozens of frequency groups with hundreds or thousands of packet streams/timers per group.

Figures 9A, 9B:
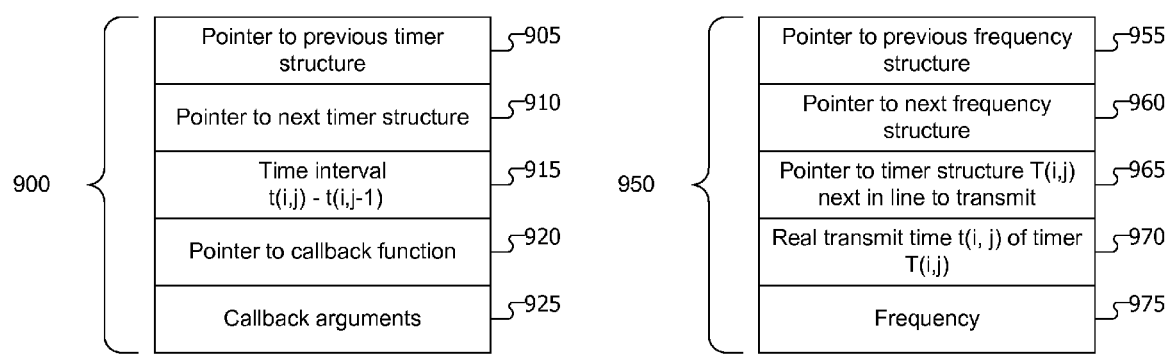
FIG. 9A is a diagram of a timer data structure.
FIG. 9B is a diagram of a frequency data structure.

Referring now to FIG. 9A, each timer data structure 900 may be comprised of a pointer 905 to the previous timer data structure, a pointer 910 to the next timer data structure, the time interval 915 between the event associated with each timer data structure and the event associated with the previous timer data structure, a pointer 920 to a callback function, and an optional callback function argument or arguments 925. The callback function may be a software routine that initiates the transmission of the next packet in the associated packet stream. The callback function arguments 925 may be any data needed to execute the callback function.

Within this description and the following claims, the term "pointer" is intended to encompass any data element that allows a data structure to relate to or reference another data structure. Thus a "pointer" may be a pointer (in the narrowest sense of the term), an address, an index, a link, a reference, or any other data form that allows a data structure to relate to or reference another data structure.

Referring back to FIG. 8, the timer data structures within frequency group 810 are organized as a doubly-linked circular list. The list is doubly-linked because each timer data structure contains a pointer to both the preceding and following data structure. The list is circular because the last timer data structure T(0,3) has a pointer to the first timer data structure T(0,0). Returning again to FIG. 9, since each timer data structure 900 has pointers 905/910 to the adjacent data structures, the data structures can be stored anywhere in the memory of a computing device, and do not have to be stored in a sequential table.

Each timer data structure 900 contains the time interval value 915. It must be appreciated that the sum of the time interval values of timer data structures T(0,0), T(0,1), T(0,2) and T(0,3) should be equal to the period between successive packet transmissions on any of the packet streams associated with these timer data structures, or the inverse of the packet frequency for this frequency group.

The doubly-linked circular list greatly facilitates adding or dropping timer data structure/packet streams from the frequency group. For example, timer data structure T(0,2) can be dropped simply by changing pointer values in T(0,1) and T(0,3), and changing the time interval value in T(0,3). A new timer data structure/packet stream can be added by creating the new timer data structure and callback function and then changing two pointer values and a time interval value within the existing circular list.

Returning to FIG. 8, each of the three frequency groups 810, 820, 830 has a corresponding frequency data structure F(0), F(1), F(2), respectively. Referring to FIG. 9B, each frequency data structure 950 contains a pointer 955 to the previous frequency data structure and a pointer 960 to the next frequency data structure. The two pointers 955/960 allow the frequency data structures to be organized as a second doubly-linked circular list. Each frequency data structure 950 contains a pointer 965 to the timer data structure within the corresponding frequency group that is next in line to initiate transmission of a packet. Each frequency data structure 950 also includes the real transmission time 970 for the next packet to be transmitted within the frequency group. Each frequency data structure 950 also contains the packet frequency 975 of the corresponding frequency group.

Since each frequency data structure holds the real transmission time of the next packet to be transmitted within the corresponding frequency group, the most urgent packet can be identified simply by identifying the frequency data structure with the earliest transmission time value. A root pointer 750 is set to point to the frequency data structure that, in turn, points to the timer data structure associated with the most urgent packet.

Figure 10:
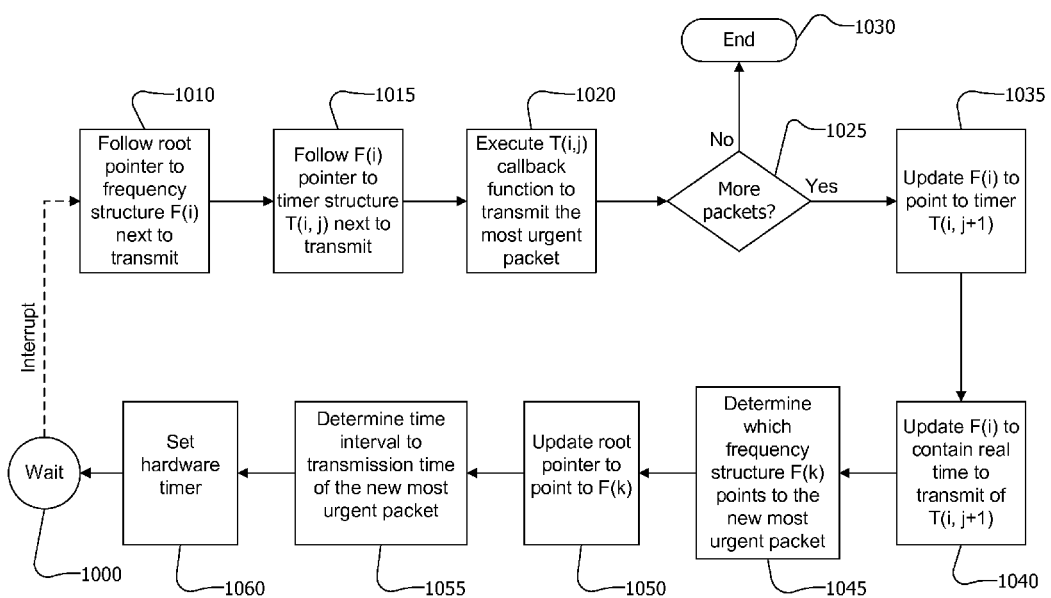
FIG. 10 is a flow chart of a process of operating a multiple period timer.

FIG. 10 is a flow chart of the process of operating a multiple period timer using the data structures of FIG. 8 and FIG. 9. Assume, to start, that the process is waiting at 1000 for an interrupt from a hardware timer. Upon receipt of the interrupt (dashed line), an interrupt handler software routine follows the root pointer to a frequency structure F(i) at 1010. The root pointer was previous set such that frequency structure F(i) is known to point to the timer data structure associated with the most urgent packet. At 1015, the interrupt handler follows the pointer in F(i) to the timer structure T(i,j) which is associated with the most urgent packet. At 1020, the T(i,j) callback function is executed to compose and initiate transmission of the most urgent packet. A decision is made at 1025, and the process terminates at 1030 if all packets have been transmitted.

Continuing at 1035, the pointer in F(i) is updated to point to timer T(i,j+1). Because of the organization of the timer data structures, T(i,j+1) is known to be associated with the next packet to be transmitted within the frequency group associated with F(i). At 1040, the time value within F(i) is updated to contain the real time to transmit of T(i,j+1). The frequency structure F(k) associated with the new most urgent packet is identified 1045 and the root pointer is updated 1050. The time interval to the transmission of the most urgent packet is determined 1055 and the hardware timer is set appropriately 1060. The multiple period timer process then waits 1000 for the interrupt from the hardware timer and the cycle repeats.

It should be appreciated that steps 1010 and 1015 in FIG. 10 are the functional equivalent of step 745 in FIG. 7. Similarly step 1020 is the functional equivalent of steps 750 and 755, and steps 1035, 1040, 1045, and 1050 are the functional equivalent of step 720. Steps 1055 and 1060 are the functional equivalents of steps 725 and 730, respectively.

The multiple timer process of FIG. 7 or FIG. 10 may be used to time other events in addition to timing the transmission of packet streams. For example, the decrementer in a Power PC computer may normally be used to provide an internal timing interval commonly termed a "jiffy". The jiffy timing interval may be used to control a number of functions within the computer. A Power PC computing system running the Linux operating system may typically have the jiffy set to be 10 milliseconds. Referring to FIG. 8, the frequency group F(2) is only associated with a single timer T(2,0). Timer T(2,0) may contain a pointer to a callback function that updates the jiffy, rather than initiating the transmission of a packet. The multiple timer process of FIG. 7 or FIG. 10 may be used to control a plurality of repetitive events in computing system for an application other than packet generation.

Figure 11:
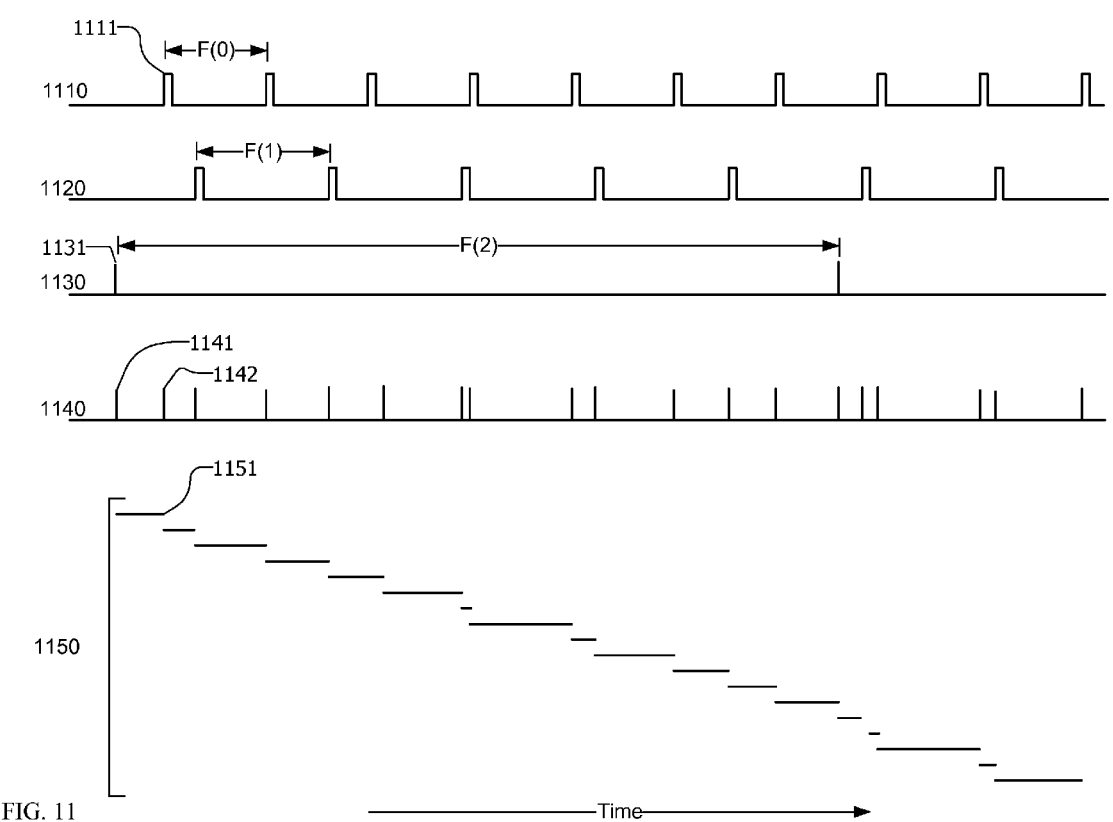
FIG. 11 is a timing diagram for a multiple period timer.

FIG. 11 illustrates the operation of a simplified example of a multiple period timer process such as that of FIG. 7 or FIG. 10. The line 1110 represents the transmission of a first packet stream at a first packet frequency F(0). The step at 1111 represents the transmission of a packet. The duration of the packet transmission time at 1111 is greatly exaggerated for clarity. Similarly, line 1120 represents the transmission of a second packet stream at a packet frequency f(2). Line 1130 represents another periodic event, such as updating the jiffy in a computer system using the Linux operating system.

The line 1140 shows the interrupts issued by a single hardware timer. Interrupt 1141 initiated event 1131, and interrupt 1142 initiated the transmission of the packet at 1111. The multiple line segments 1150 represent the time periods set into the hardware timer. Time period 1151 represents the interval between interrupts 1141 and 1142.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A process to generate packets, comprising:
   defining a first packet stream comprising a first plurality of packets;
   composing and transmitting the first plurality of packets at a first packet frequency, wherein
      the transmission of the first plurality of packets is controlled by a first series of interrupts from a hardware timer, and
      each packet of the first plurality of packets is comprised of a first background data field and one or more user defined fields that overlay the first background data field;
   defining a second packet stream comprising a second plurality of packets;
   composing and transmitting the second plurality of packets at a second packet frequency different from the first packet frequency, wherein
      the first packet stream and the second packet stream are transmitted, at least in part, concurrently, and
      the transmission of the second plurality of packets at the second packet frequency is controlled by a second series of interrupts interleaved with the first series of interrupts from the hardware timer; and
   generating a time reference signal controlled by a third series of interrupts interleaved with the first series of interrupts and second series of interrupts from the hardware timer.

2. The process to generate packets of claim 1, wherein the first background data field is fixed and common to all packets of the first plurality of packets.

3. The process to generate packets of claim 2, wherein the one or more user defined fields contain data that changes between successive packets of the first plurality of packets.

4. The process to generate packets of claim 3, wherein a user defined field is selected from the group consisting of a random number, a counter, an IP checksum, a UDP checksum, and a value selected sequentially from a table of values.

5. The process to generate packets of claim 1, wherein
   defining a first packet stream is performed by an application program operating in a user space
   composing and transmitting the plurality of packets is performed by a generic packet generator program operating in kernel space.

6. The process to generate packets of claim 1, wherein defining a first packet stream further comprises:
   defining the first background data, a number of packets in the first plurality of packets, and a first packet frequency
   defining the type, position, length, and at least one parameter for each of the one or more user defined fields.

7. The process to generate packets of claim 1, wherein
   defining a first packet stream further comprises defining a maximum packet length, a minimum packet length, and a statistical distribution between the maximum packet length and the minimum packet length
   composing and transmitting the first plurality of packets further comprises randomly determining the length of each packet as defined in the first packet stream description.

8. A process to generate packets, comprising:
   composing and transmitting a first packet stream at a first packet frequency;
   composing and transmitting a second packet stream at a second packet frequency not equal to the first packet frequency; and
   controlling the transmission of the first packet stream and the second packet stream by interrupts from a single hardware timer,
   wherein the first packet stream and the second packet stream are transmitted, at least in part, concurrently, and
   wherein controlling the transmission of the first packet stream and the second packet stream further comprises:
      identifying a most urgent packet, where the most urgent packet is either the next packet to be transmitted from the first packet stream or the next packet to be transmitted from the second packet stream, whichever has to be transmitted first;
      determining a time interval between the present time and a required time to initiate transmission of the most urgent packet;
      setting the hardware timer to issue an interrupt after the time interval;
      receiving the interrupt from the hardware timer;
      initiating transmission of the most urgent packet; and
      repeating from identifying a most urgent packet until all packets in the first packet stream and the second packet stream have been transmitted.

9. A process to generate packets, comprising:
   composing and transmitting a plurality of packet streams at multiple packet frequencies; and
   controlling the transmission of the plurality of packet streams using interrupts from a single hardware timer,
   wherein the plurality of packet streams are transmitted, at least in part, concurrently, and
   wherein controlling the transmission of the plurality of streams of packets further comprises:

identifying a most urgent packet, wherein the most urgent packet is the next packet to be transmitted selected from all of the plurality of packet streams;

determining a time interval between the present time and a required time to initiate transmission of the most urgent packet;

setting the hardware timer to issue an interrupt after the time interval;

receiving the interrupt from the hardware timer;

initiating transmission of the most urgent packet and repeating from identifying a most urgent packet until all the packets in the plurality of packet streams have been transmitted.

10. The process to generate packets of claim 9, where in identifying a most urgent packet further comprises:

sorting the packet streams into a plurality of frequency groups where all periodic events in a frequency group occur at the same frequency for each frequency group:
sorting the packet streams by order of occurrence
forming an ordered doubly linked list of timer data structures, each timer data structure associated with one of the plurality of packet streams and each timer data structure including a pointer to a callback function to initiate transmission of the next packet in the associated packet stream forming a doubly linked list of frequency data structures, wherein
each frequency data structure corresponds to a frequency group
each frequency data structure includes a pointer to the timer data structure corresponding to the packet stream containing the next packet to be transmitted within the corresponding frequency group setting a root pointer to point to the frequency data structure corresponding to the frequency group containing the most urgent packet.

11. A computing device to generate packets, the computing device comprising:
a processor;
a memory coupled with the processor;
a hardware interface to the communication network;
a hardware timer; and
a computer readable storage medium having instructions stored thereon which when executed cause the computing device to perform actions comprising:
defining a first packet stream comprising a first plurality of packets;
composing and transmitting the first plurality of packets at a first packet frequency, wherein
the transmission of the first plurality of packets is controlled by a first series of interrupts from the hardware timer, and
each packet of the first plurality of packets is comprised of a first background data field and one or more user defined fields that overlay the first background data field;
defining a second packet stream comprising a second plurality of packets:
composing and transmitting the second plurality of packets at a second packet frequency different from the first packet frequency, wherein
the first packet stream and the second packet stream are transmitted, at least in part, concurrently, and
the transmission of the second plurality of packets at the second packet frequency is controlled by a second series of interrupts interleaved with the first series of interrupts from the hardware timer; and
generating a time reference signal controlled by a third series of interrupts interleaved with the first series of interrupts and second series of interrupts from the hardware timer.

12. A computer readable storage medium having instructions stored thereon which when executed by a computing device will cause the computing device to perform actions comprising:
defining a first packet stream comprising a first plurality of packets;
composing and transmitting the first plurality of packets at a first packet frequency, wherein
the transmission of the first plurality of packets is controlled by a first series of interrupts from a hardware timer, and
each packet of the first plurality of packets is comprised of a first background data field and one or more user defined fields that overlay the first background data field;
defining a second packet stream comprising a second plurality of packets;
composing and transmitting the second plurality of packets at a second packet frequency different from the first packet frequency, wherein
the first packet stream and the second packet stream are transmitted, at least in part, concurrently, and
the transmission of the second plurality of packets at the second packet frequency is controlled by a second series of interrupts interleaved with the first series of interrupts from the hardware timer; and
generating a time reference signal controlled by a third series of interrupts interleaved with the first series of interrupts and second series of interrupts from the hardware timer.

13. A computing device to generate packets, the computing device comprising:
a processor
a memory coupled with the processor
a hardware interface to the communication network
a computer readable storage medium having instructions stored thereon which when executed cause the computing device to perform actions comprising:
composing and transmitting a first packet stream at a first packet frequency;
composing and transmitting a second packet stream at a second packet frequency not equal to the first packet frequency; and
controlling the transmission of the first packet stream and the second packet stream by interrupts from a single hardware timer,
wherein the first packet stream and the second packet stream are transmitted, at least in part, concurrently and
wherein controlling the transmission of the first packet stream and the second packet stream further comprises:
identifying a most urgent packet, where the most urgent packet is either the next packet to be transmitted from the first packet stream or the next packet to be transmitted from the second packet stream, whichever has to be transmitted first;
determining a time interval between the present time and a required time to initiate transmission of the most urgent packet;

setting the hardware timer to issue an interrupt after the time interval;

receiving the interrupt from the hardware timer;

initiating transmission of the most urgent packet; and repeating from identifying a most urgent packet until all packets in the first packet stream and the second packet stream have been transmitted.

14. A computer readable storage medium having instructions stored thereon which when executed by a computing device will cause the computing device to perform actions comprising;

composing and transmitting a first packet stream at a first packet frequency;

composing and transmitting a second packet stream at a second packet frequency not equal to the first packet frequency; and controlling the transmission of the first packet stream and the second packet stream by interrupts from a single hardware timer, wherein the first packet stream and the second packet stream are transmitted, at least in part, concurrently, and wherein controlling the transmission of the first packet stream and the second packet stream further comprises:

identifying a most urgent packet, where the most urgent packet is either the next packet to be transmitted from the first packet stream or the next packet to be transmitted from the second packet stream, whichever has to be transmitted first;

determining a time interval between the present time and a required time to initiate transmission of the most urgent packet;

setting the hardware timer to issue an interrupt after the time interval;

receiving the interrupt from the hardware timer;

initiating transmission of the most urgent packet; and repeating from identifying a most urgent packet until all packets in the first packet stream and the second packet stream have been transmitted.

* * * * *